(12) United States Patent
Palazzolo

(10) Patent No.: US 6,668,769 B1
(45) Date of Patent: Dec. 30, 2003

(54) TWO STROKE HYBRID ENGINE

(76) Inventor: Henry P. Palazzolo, 1393 Fontaine Ave., Madison Heights, MI (US) 48071

( * ) Notice: Subject to any disclaimer, the term of this patent is extended or adjusted under 35 U.S.C. 154(b) by 0 days.

(21) Appl. No.: 10/138,616

(22) Filed: May 3, 2002

Related U.S. Application Data
(60) Provisional application No. 60/297,350, filed on Jun. 11, 2001.

(51) Int. Cl.[7] .................................................. F02B 75/02
(52) U.S. Cl. ................................. 123/65 BA; 123/70 R
(58) Field of Search ............................... 123/68, 69 R, 123/69 V, 70 R, 70 V, 65 B, 65 BA

(56) References Cited

U.S. PATENT DOCUMENTS

| | | | | |
|---|---|---|---|---|
| 3,180,323 A | * | 4/1965 | Paschke | 418/86 |
| 3,383,936 A | * | 5/1968 | Corwin | 74/433 |
| 4,019,324 A | * | 4/1977 | Coxon | 60/624 |
| 4,215,659 A | * | 8/1980 | Lowther | 123/68 |
| 4,860,699 A | * | 8/1989 | Rocklein | 123/26 |
| 4,964,275 A | * | 10/1990 | Paul et al. | 60/605.1 |
| 5,203,307 A | * | 4/1993 | Burtis | 123/242 |
| 6,164,942 A | * | 12/2000 | Moller | 418/86 |

* cited by examiner

Primary Examiner—Tony M. Argenbright
Assistant Examiner—Katrina B. Harris
(74) Attorney, Agent, or Firm—John R. Benefiel

(57) ABSTRACT

A high efficiency two stroke hybrid engine includes a piston engine driving a trochoidal rotor compressor which compresses air injected into a combustion chamber as the piston approaches top dead center into which fuel is also injected during each engine cycle.

3 Claims, 5 Drawing Sheets

1. IGNITION
2. POWER STROKE
3. EXHAUST
4. AIR AND FUEL INJECTION

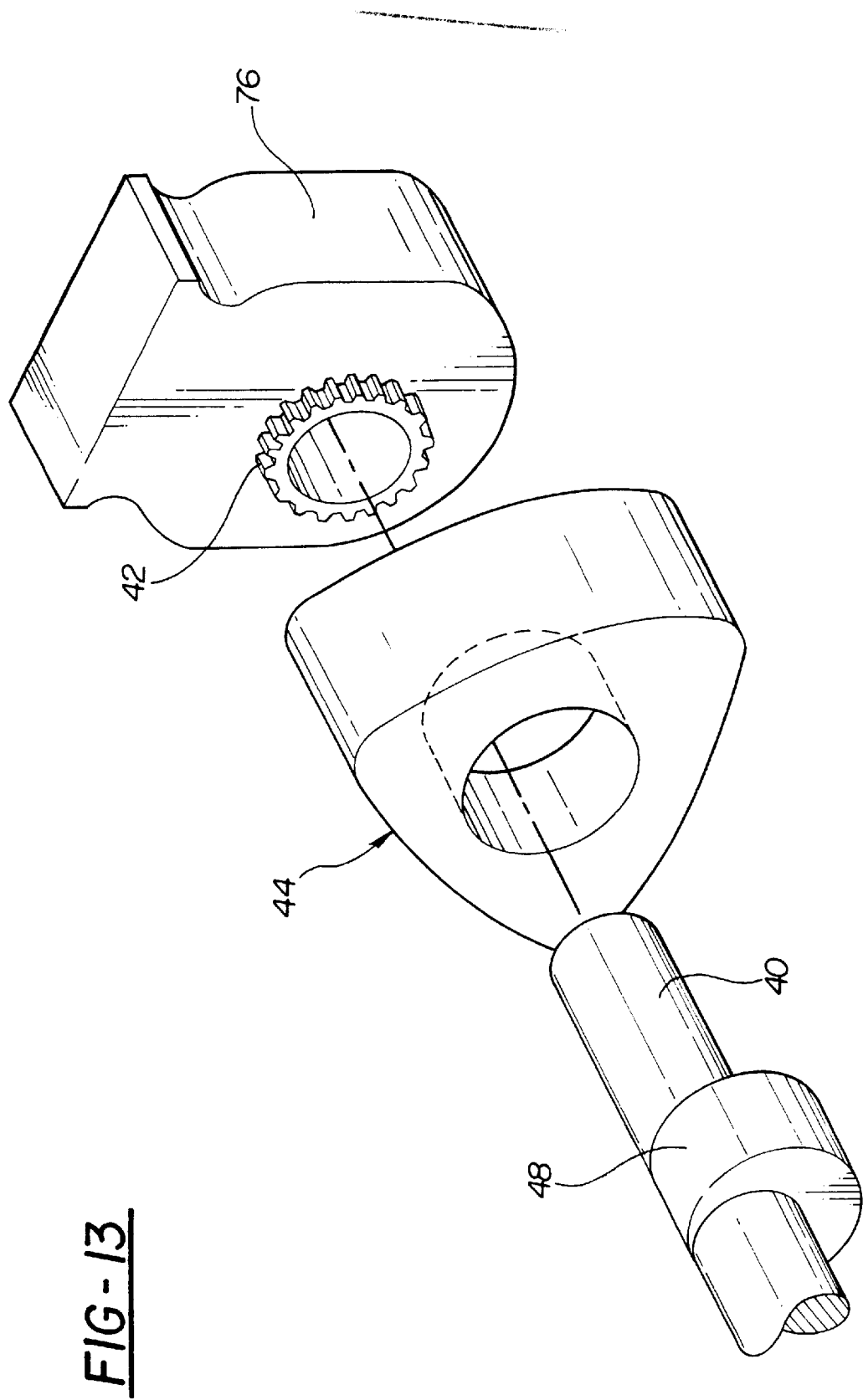

TWO STROKE HYBRID ENGINE

CROSS-REFERENCE TO RELATED APPLICATION

This application claims the benefit of U.S. provisional serial No. 60/297,350, filed Jun. 11, 2001.

BACKGROUND OF THE INVENTION

This invention concerns engines and more particularly internal combustion piston engines of the two stroke type where an air charge is directed into the combustion chamber defined in part by a piston to be compressed by the piston and fuel mixed in the air is burned to create a power stroke as the piston moves down.

The piston does work as a compressor in compressing the inducted air mass, and this reduces the net power produced by the engine. Supercharging increases the mass of combusted air compressed in the chamber and this increases the engine power output. Supercharging is accomplished by roots blowers, exhaust driven turbines, and other externally driven devices. However, the pistons still act as compressors on the pressurized air introduced into the engine by the supercharger.

The inefficiency of the piston engine operating as a compressor reduces the overall efficiency of the engine, and the superchargers heretofore used have not alleviated this source of inefficiency as supercharged engines still use the pistons as compressors. Such prior superchargers have not approached the efficiency of the trochoidal rotor compressor.

It is the object of the present invention to improve the efficiency of the internal combustion piston engine by providing a more efficient air compressor.

Two stroke engines also are less fuel efficient since some fuel is exhausted because the cylinder is purged with the incoming fuel-air charge. Also, pressurization of the crank case prevents the use of a conventional pressure lubrication system.

Two stroke diesel engines have incorporated a supercharger, with incoming air purging the combustion chamber to alleviate these drawbacks.

However, the compressed air exhausted wastes power, and the blowers used are also inefficient.

SUMMARY OF THE INVENTION

The above recited object and others which will become apparent upon a reading of the following specification and claims are achieved by a two stroke hybrid engine in which substantially fully compressed air is introduced into the combustion chamber as the piston approaches top dead center. A trochoidal compressor is coupled to a two stroke piston engine via its crankshaft, so as to produce the highly compressed air, which is then directed into the combustion chambers upon opening of an intake valve or valves. The piston is not substantially relied on to compress the air charge, but rather the very efficient trochoidal rotor compressor takes over this function to significantly improve the engine net power output. Fuel is injected into the compressed air and ignited to generate a power stroke.

In a diesel form of the invention, the air may be compressed sufficiently to ignite the fuel as it is injected.

DESCRIPTION OF THE DRAWINGS

FIG. 13 is an exploded perspective view of a rotor, cam shaft and reaction gear included in the trochoidal rotor compressor.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
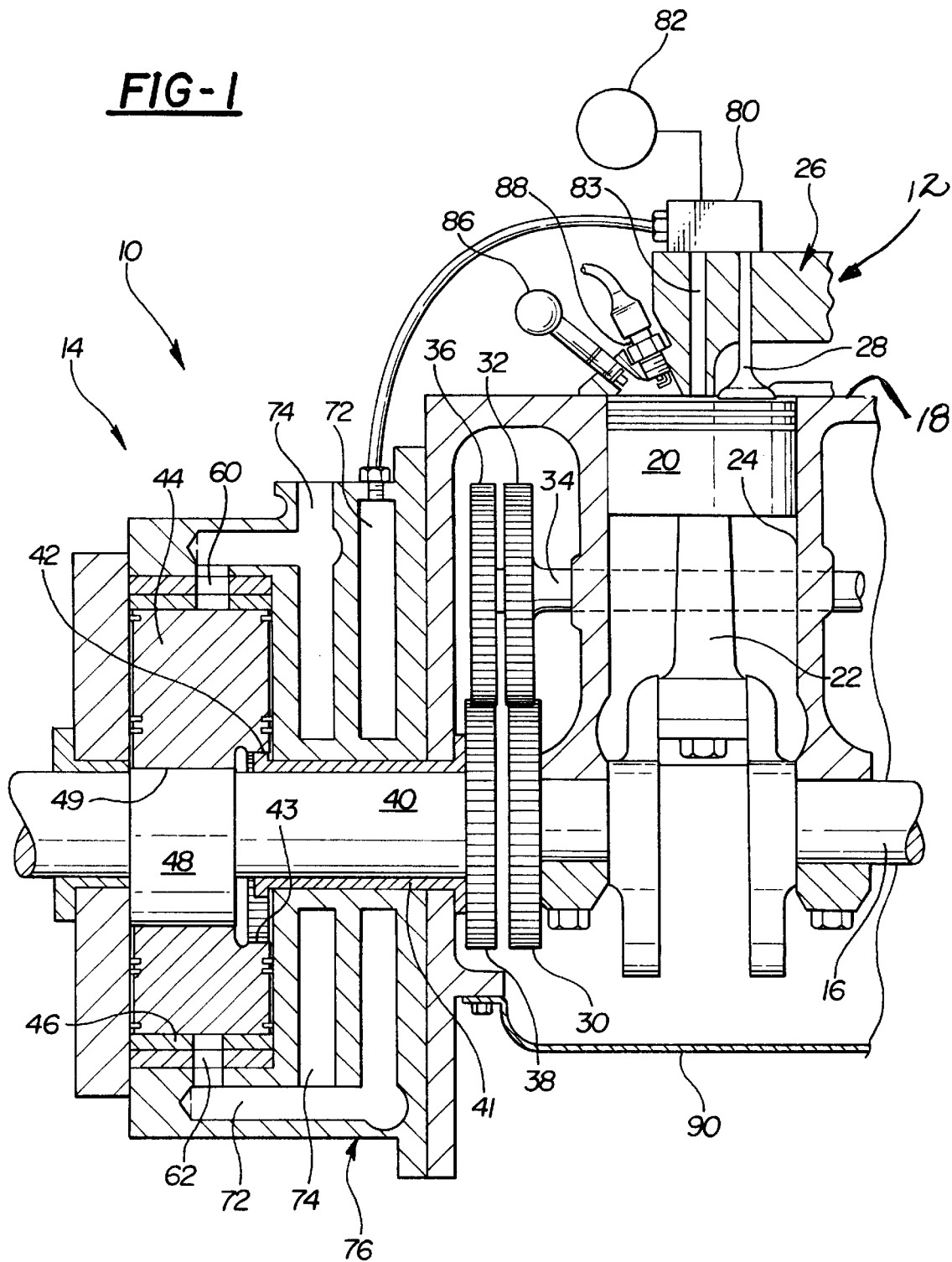
FIG. 1 is a partially sectional view taken lengthwise through a two stroke hybrid engine according to the present invention.

Referring to the drawings and particularly FIG. 1, the hybrid engine 10 according to the present invention includes a two stroke piston and cylinder engine 12 and a trochoidal rotor compressor assembly 14 driven by the piston and cylinder engine 12.

A plurality of cylinders would normally be provided in the engine 12, only one typical cylinder shown in FIG. 1.

A crank shaft 16 is journaled in an engine block 18 and is driven by each piston 20 by a respective connecting rod 22, the piston reciprocated in a respective cylinder bore 24 and defining in part a combustion chamber above the top of the piston 20.

A cylinder head 26 closes off the top of the combustion chamber and mounts one or more exhaust valves 28 opened and closed in a timed manner as by a conventional cam shaft driven valve operating mechanism (not shown).

The crankshaft 16 has affixed thereto at one end, a drive gear 30, engaged with a first timing gear 32 on a cam shaft 34 rotatably mounted offset from the crankshaft 16 as viewed in FIG. 1, with an aligned second idler gear 36 also affixed to the cam shaft 34.

A compressor drive gear 38 is engaged by the second idler gear 36 to be driven thereby, to drive a compressor drive shaft 40 aligned with the engine crankshaft 16. The relative size of the gears 36 and 38 can be changed to change the speed of the compressor.

One end of the compressor drive shaft 40 is received in a rotationally fixed sleeve 41 having a reaction gear 42 attached thereto. The compressor 14 includes a trochoidal rotor 44 disposed within a chamber 46. An internal gear 43 is tangentially engaged by the fixed reaction gear 43. A cam 48 is integral with the compressor drive shaft 40 to be driven thereby and is rotatable within a bore 49 in the rotor 44.

Figure 2:
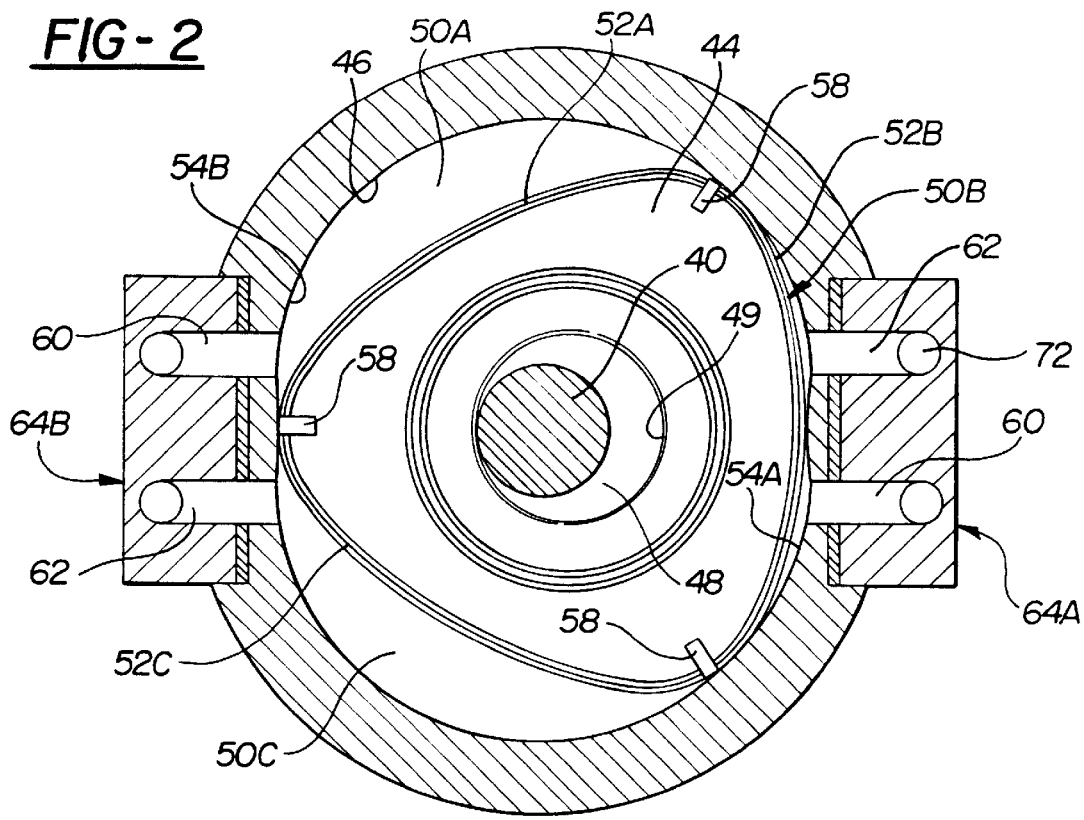
FIG. 2 is a transverse sectional view taken across the trochoidal rotor compressor incorporated in the two stroke hybrid engine shown in FIG. 1.
Figure 3:
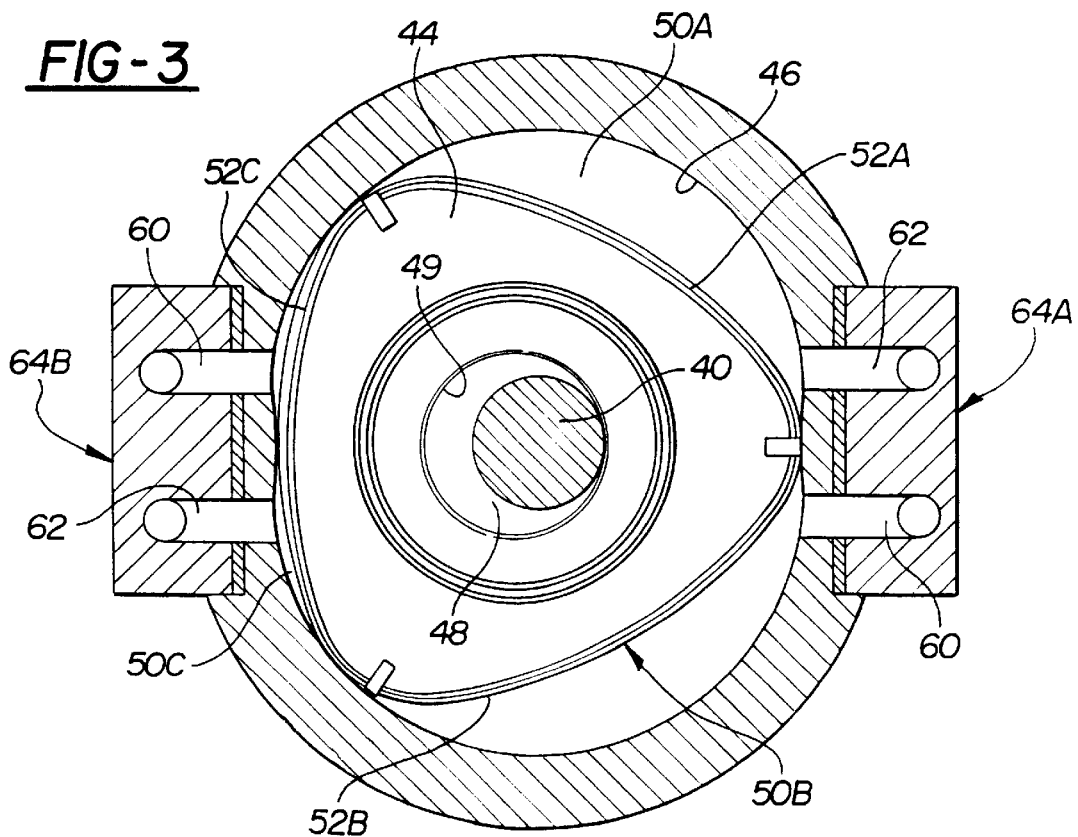
FIG. 3 is another sectional view through the trochoidal rotor as in FIG. 2 with the rotor rotated to another position.

Rotation of the shaft 40 and cam thus causes the rotor 44 to move about the chamber 46 to create successively three regions of increasing and decreasing volume between each trochoidal rotor face 52A, 52B, 52C and two opposite walls 54A, 54B of the chamber 46, as indicated in FIGS. 2 and 3.

This arrangement is well known in the context of the rotary or Wankel engine. Suitable seals such as radial seals 58 at the lobes of the rotor 44 and bearings are included as well known to those skilled in the art, and are therefore not described in detail here.

Each chamber side wall 54A, 54B is provided with two inlet valve ports 60 and one outlet valve port 62 extending into a respective valve body 64A, 64B. Two inlets are provided since the inlet air is at lower pressure, necessitating a larger area inlet.

Oppositely directed flap or reed valves 66, 68 on a valve plate 70 are associated with the inlet and outlet valve ports 60, 62 to control air flow (FIGS. 9–12).

Thus, as each region 50A, 50B, 50C decreases in volume to a minimum (see region 50B in FIG. 2), the outlet valve port 62 opens to direct compressed air to flow into an outlet passage 72 in manifolding 76. When the regions are increasing in volume, the inlet valve ports 60 open to allow air intake via passages 74 (FIG. 1).

Figure 4:
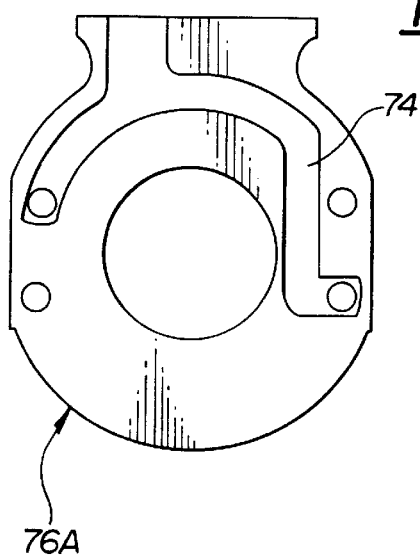
FIG. 4 is an end view of one of the porting plates included in the trochoidal rotor compressor.
Figure 5:
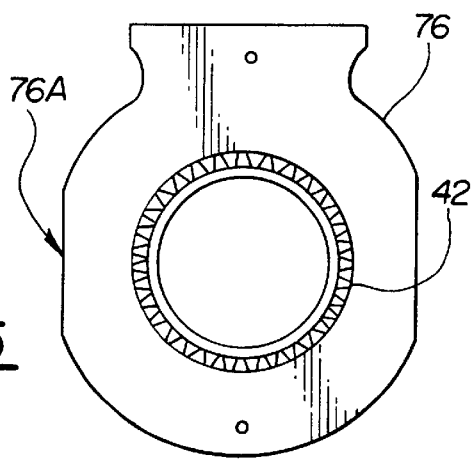
FIG. 5 is an opposite end view of the porting plate shown in FIG. 4.
Figure 6:
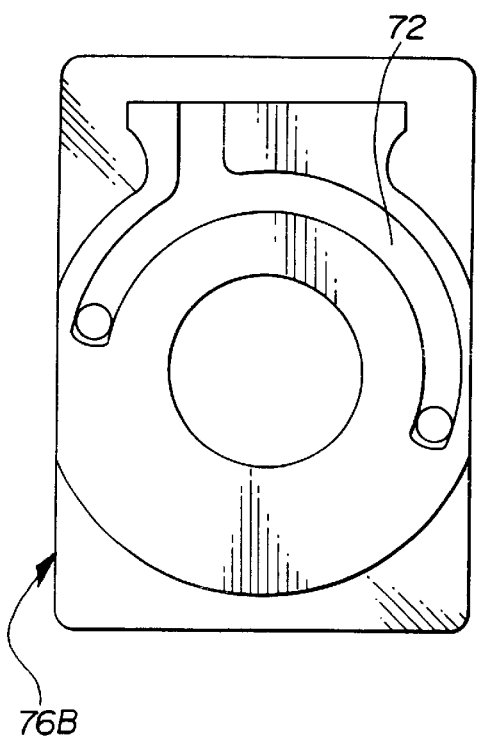
FIG. 6 is an end view of another porting plate included in the trochoidal rotor compressor including in the hybrid engine shown in FIG. 1.
Figure 7:
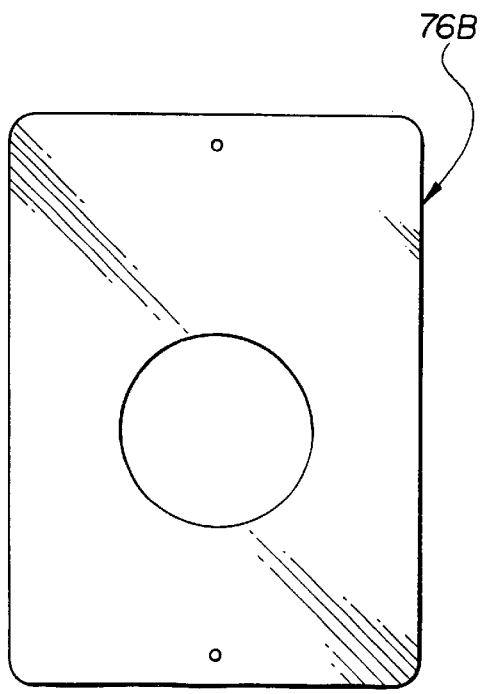
FIG. 7 is an opposite end view of the porting plate shown in FIG. 6.

Manifolding 76 can be made by two separately machined plates 76A, 76B, FIGS. 4 or 5, a plate 76B shown reversed in FIGS. 6 and 7.

The outlet passages 72 connect to a conduit 78 directing highly compressed air to an air injection valve 80 opened at a precisely timed point in the engine cycle by a control 82 to inject the precompressed air into the combustion chamber via passage 83 as the piston 70 approaches top dead center, the exhaust valves 28 have then been closed. Fuel is injected as by an injector 84 and control 86, and a spark plug 88 energized at the exact time in the cycle to initiate combustion and a power stroke. Fuel could also be introduced into the intake air prior to compression, as by a carburetor.

The air must be precompressed to a pressure approaching the designed for compression ratio prior to being injected in order to minimize engine work.

Figure 8:
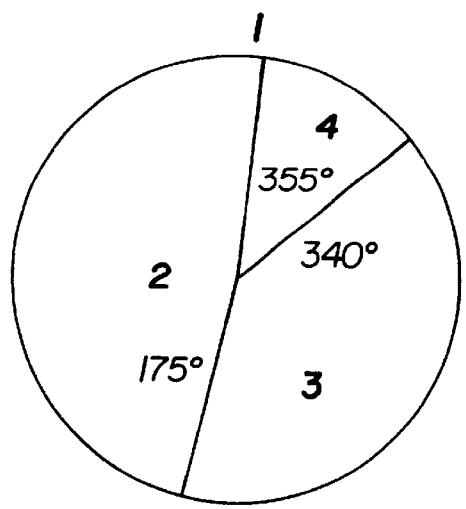
FIG. 8 is a diagrammatic representations of the two stroke hybrid engine cycle.
Figure 9:
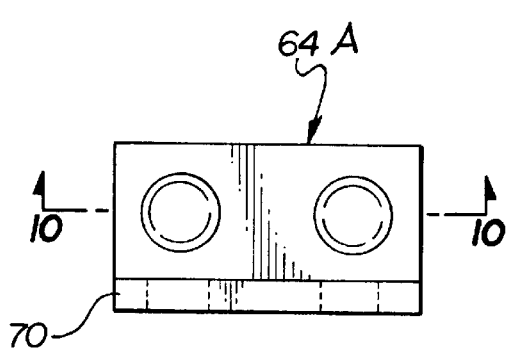
FIG. 9 is a top view of a first valve body included in the trochoidal rotor compressor included in the two stroke hybrid engine shown in FIG. 1.
Figure 10:
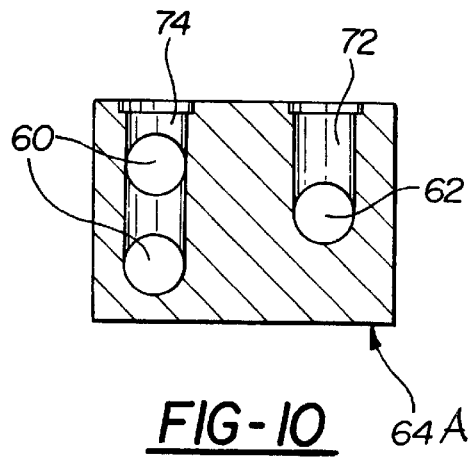
FIG. 10 is a view of the section through the first valve body taken along the lines 10—10 in FIG. 9.
Figure 11:
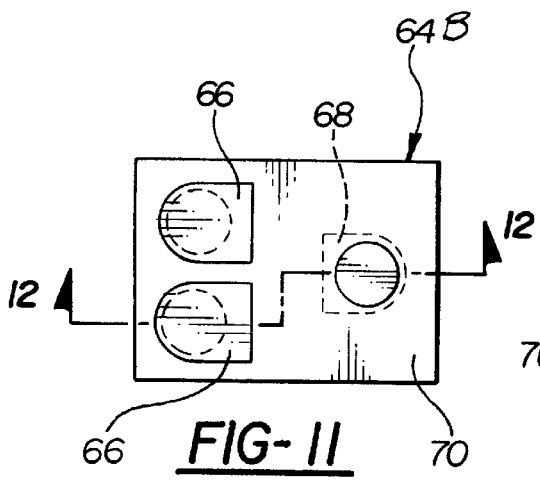
FIG. 11 is a bottom view of a second valve body included in the trochoidal rotor compressor shown in FIG. 1.
Figure 12:
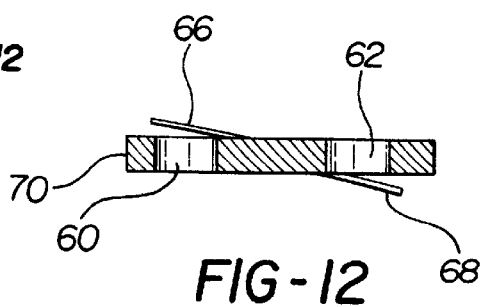
FIG. 12 is a view of the section taken along the lines 12—12 in FIG. 11.

FIG. 8 depicts the two stroke hybrid engine cycle. Ignition 1 initiates the power stroke 2 (175°) after which the exhaust valves 28 are opened to allow exhaust gases to be discharged during the exhaust interval 3 (175°–340°). Compressed air (and fuel) are injected during stage 4 (355°) after the exhaust valves are closed preparatory to another ignition and power stroke.

Accordingly, most of the compression of the charge air is not carried out by the piston stroking but by the more efficient trochoidal rotor compressor to create a more efficient two stroke hybrid engine.

The crankcase 90 is not pressurized so as to allow the use of a conventional pressurized lubrication system.

The rotor 44 preferably has its outer perimeter machined in a simple lathe by chucking the drive shaft 40 and engaging a turning tool against the perimeter of the rotor 44 which is meshed with a fixed reaction gear 42. The curved sides and corners will be generated by rotating the cam 48 in the rotor 44.

Similarly, the trochoidal housing surface 46 can be generated in a lathe by a tooling piece derived from a rotor, with tooling cutters affixed at the lobe tips. The drive shaft is chucked and the cam 48 rotated with a fixed reaction gear engaged with the tooling piece. The trochoidal surface 46 mating with the rotor will be perfectly generated by the tools.

The curving sides of the rotor and rounded lobe corners produce a minimum volume of the chambers 50A, B, C at maximum compression to create a very high efficiency compressor.

The two stroke engine described above as a spark ignition engine, but the invention is also useful in a compression ignition or diesel engine. Prior two cycle diesels have used supercharging, but have expended power in purging the cylinders with compressed air, a portion used to purge the cylinder which goes out with the exhaust. Here, the piston displaces the products of combustion, and the compressed air is not introduced until the piston approaches top dead center, so no compressed air is vented to exhaust, improving engine efficiency. The ignition device is of course not required in this form of the engine, as the degree of compression of the air is designed to be sufficient to raise the temperature to the fuel ignition point as the engine piston reaches top dead center such that the fuel is ignited as it is injected in the manner of the conventional diesel engine. A diesel type fuel injection device is used in this case.

What is claimed is:

1. A two stroke hybrid piston engine comprising:

a piston reciprocating within an engine cylinder defining in part a combustion chamber within a cylinder in an engine block, a crank shaft and connecting rod reciprocating said piston in said cylinder;

a compressor driven by said crankshaft compressing air and delivering the same to an inlet passage connected to said combustion chamber, said compressor comprising a trochoidal rotor compressor mounted at one end of said engine block aligned with said crankshaft; an air injection valve controlling communication of said inlet passage with said combustion chamber, said valve opened by a valve operating device as said piston approaches top dead center to cause injection of precompressed air from said compressor into said combustion chamber; and a fuel injector injecting fuel into said precompressed air in said combustion chamber.

2. The two stroke hybrid engine according to claim 1 wherein said trochoidal rotor compressor includes a drive shaft aligned with said crankshaft, said crankshaft driving interposed gearing driving said compressor drive shaft, a cam affixed to said drive shaft, a trochoidal rotor revolvably mounted on said cam, and a chamber defined by walls of a housing within which said rotor is moved to create successive intake and compression of air of spaces defined between said trochoidal rotor and said chamber walls.

3. The two stroke hybrid engine according to claim 1 further including compressor manifolding interposed between said trochoidal compressor and said engine block having passages directing intake air into said compressor and receiving compressed air therefrom to be directed to said air injection valve.

\* \* \* \* \*